March 21, 1967  H. SCHIMMEL  3,310,665
MAGNETIC DETECTOR MEANS FOR PLURAL SIGNAL CORRELATOR
Filed Oct. 22, 1965  2 Sheets-Sheet 1

INVENTOR,
HOWARD SCHIMMEL

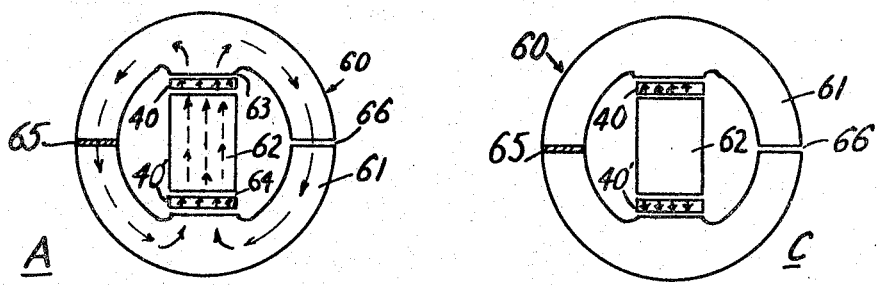
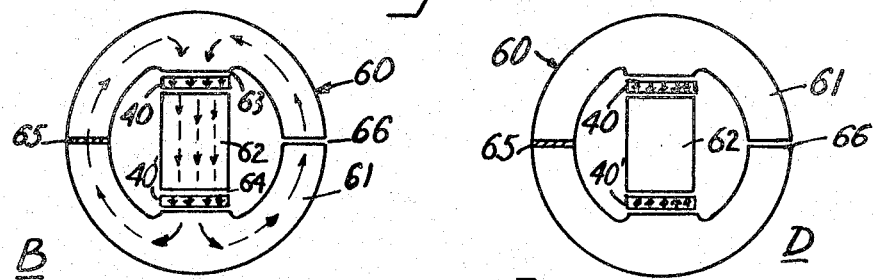
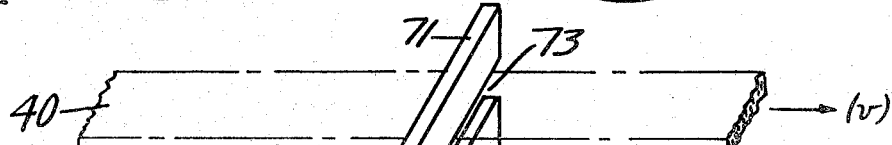
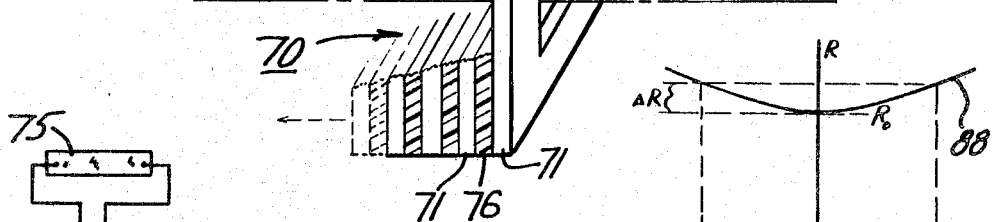
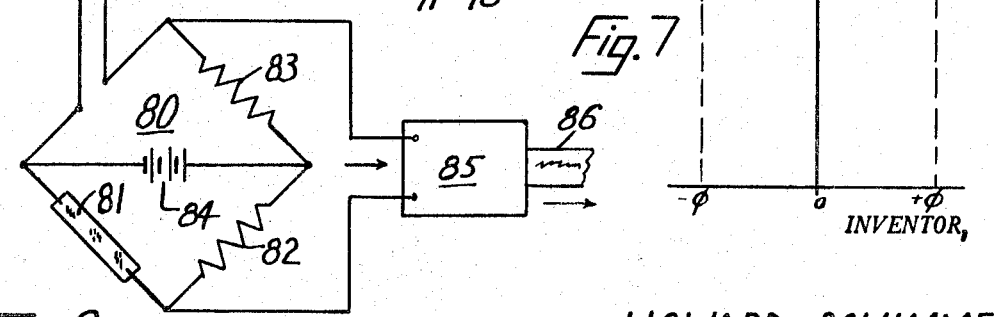

United States Patent Office

3,310,665
Patented Mar. 21, 1967

3,310,665
MAGNETIC DETECTOR MEANS FOR PLURAL SIGNAL CORRELATOR
Howard Schimmel, 64 Seely Place, Scarsdale, N.Y. 10583
Filed Oct. 22, 1965, Ser. No. 505,604
22 Claims. (Cl. 235—181)

The present invention relates to signal correlating systems, and more particularly, to novel magnetic detectors therefor.

This patent application is a continuation-in-part of my copending application Ser. No. 186,770 filed April 11, 1962, now abandoned.

Correlators are computing systems with numerous well known uses. An important application of correlators is to detect the presence of desired or meaningful weak signals in unwanted background noise. Correlators are practical for very low signal-to-noise ratios. They are employed to establish and/or analyze the nature or wave content of signal sources. Their application to repetitive or transient phenomena is well established. A detailed discussion of the theory thereof is given in "Probability and Information Theory" by Woodward published by Pergamon Press in 1953 and "Threshold Signals" by Lawson and Uhlenbeck published by McGraw-Hill in 1950.

Generically, two arbitrary functions are compared or correlated to determine any common relationship that may exist between them. In practice, two signals may be received over an interval of time from a common signal source, with one signal generally delayed with respect to the other. Any selected or computed generated time-phase delay between two arbitrary functions (signals) $f_1(t)$ and $f_2(t)$, is denoted herein by $\tau$. As is well known in the art, the cross-correlation $\psi_{12}(\tau)$ is obtained by first forming the product (in time) of $f_1(t)$ and $f_2(t-\tau)$, and integrating or averaging for a time $T$, to obtain:

$$\psi_{12}(\tau) = \frac{1}{T}\int_0^T f_1(t) x f_2(t-\tau) dt$$

The present invention provides novel, simplified and direct means for effecting such correlation between any two signals. The signals $f_1$ and $f_2$, in the exemplary form of the invention, are passed through individual clippers which quantize them into two amplitude states. The input signals initially are recorded on individual magnetic tracks or tapes. These are thereupon transported through the magnetic detector means of the invention. Desired time delay intervals ($\tau$) between them, to effect the entire correlation function, are readily performed by relative displacement of the tapes. When instead the signal tracks are fed directly into the detector, their magnitudes are thereupon squared, and their correlation is practicably effected.

The magnetic detector hereof contains a strip of magneto-resistive material, such as indium antimonide or bismuth, in the integrating magnetic section thereof. A direct measure of signal coincidences on the parallel moving magnetic tracks is obtained by resistance determinations on the strip. Making the detector unit of substantial length, in the signal track direction, results in a direct integration function over the duration that such length represents. The value of the correlation function is thereby computed instantaneously for each selected delay ($\tau$) between the signal tracks, as will be described in detail hereinafter.

The advantageous correlation system of this invention provides flexible and rapid operational techniques; direct and efficient computation; relatively accurate and comprehensive results; and comparatively inexpensive and simple structure.

The above and further objectives, advantages, and features of this invention will become more apparent in the following description of exemplary embodiments thereof, illustrated in the accompanying drawings, in which.

FIGS. 4A, 4B, 4C and 4D schematically illustrate the operation of an exemplary detector.

FIG. 5 is a schematic diagram of another exemplary coincidence detector.

FIG. 6 is a diagram of the output circuit of the exemplary detector.

FIG. 7 is a characteristic magnetic flux-resistive curve of the detector element.

Figure 1:
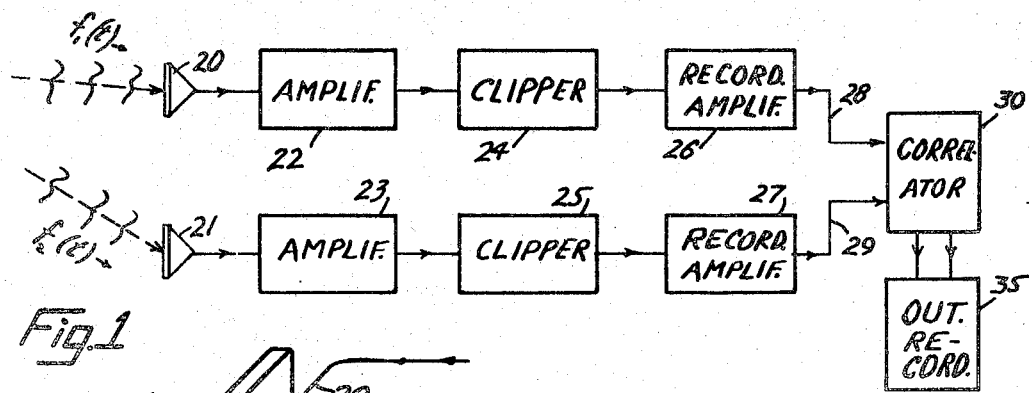
FIG. 1 is a schematic block diagram of an exemplary correlator system incorporating the invention detector.

In FIG. 1, two wave trains $f_1(t)$ and $f_2(t)$ are received by suitable sensors or receptors 20, 21. These wave trains arrive along different paths and noise backgrounds at the sensors 20, 21; and in general, are time displaced. The wave functions may be electromagnetic, acoustic, mechanical, seismographic, etc. The input signals $f_1(t)$ and $f_2(t)$ in this form of the invention are thereupon amplified at 22, 23; clipped by suitable clippers 24, 25; and further amplified by recording amplifiers 26, 27.

Figure 2:
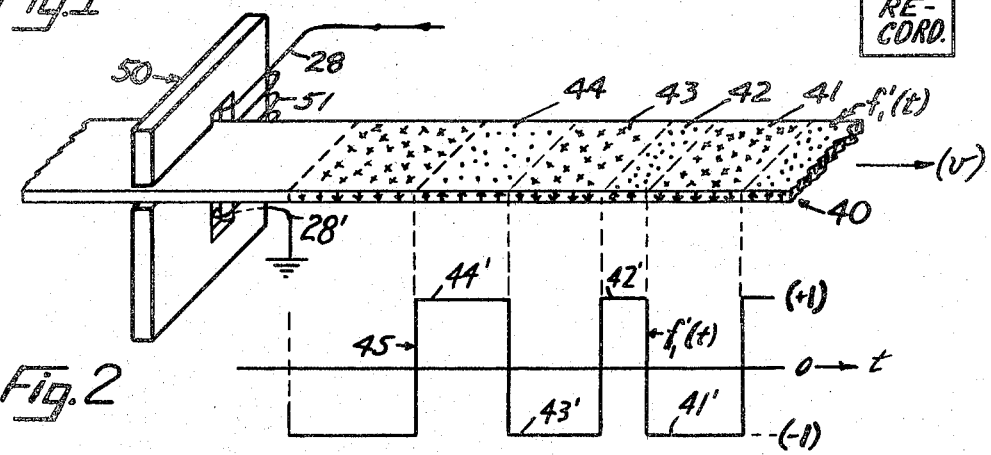
FIG. 2 is a diagrammatic representation of the magnetic recording section of the correlator system of FIG. 1.

The output leads 28, 29 of the amplifiers 26, 27 connect to the correlator, schematically indicated at 30. Correlator 30 incorporates a polarity coincidence detector, to be described in detail hereinafter. An output recorder 35 is coupled to correlator 30. One of the two magnetic tapes 40 for the signal tracks is shown in FIG. 2. A suitable constant speed $v$ transport mechanism for the two tapes 40 is included in the correlator 30. Such mechanism is well known in the art, and is omitted in the drawing, for clarity of presentation. The exemplary signal track for signal $f_1(t)$ is recorded on the tape 40 preferably using the perpendicular mode.

The clipped $f_1(t)$ signal is designated as the corresponding function $f_1'(t)$, and represented by the rectangular curve 45. The amplitude of curve 45 has been quantized to values of $\pm 1$, in a well known manner. Its phasing may be arbitrary; but this does not affect the computed results herein. The corresponding perpendicular magnetic impressions 41, 42, 43, 44 on tape 40 by the $f_1'(t)$ signal 45 through recording head 50 are indicated in FIG. 2, in exaggerated spread-out form.

The (+1) values 42' and 44' of curve 45 produce the vertically upward magnetic flux orientation regions 42, 44 in tape 40; the (−1) values 41' and 43', the downward flux orientation at corresponding regions 41, 43. The recording head 50 contains a coil 51 that connects to output lead 28 of amplifier 26 (FIG. 1); with return lead 28' shown grounded. While the exemplary recording is in the perpendicular mode, it is understood that a different magnetic mode may be instead employed, as the longitudinal or transverse. Also, it is understood that there is a similar recording head and second magnetic tape 40' in correlator 30, operated by recording amplifier 27 of the second channel signal $f_2(t)$, through lead 29. This provides a tape 40' (FIG. 3), with the clipped $f_2(t)$ signal, as $f_2'(t)$, in the perpendicular mode.

Figure 3:
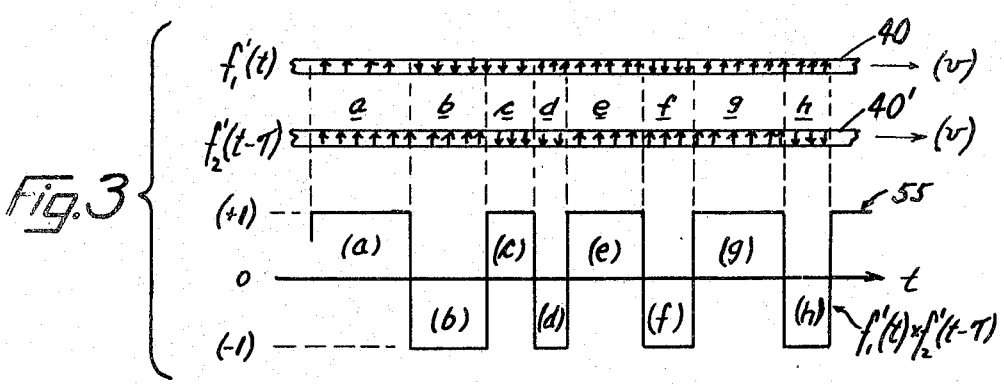
FIG. 3 illustrates the multiplication function of the exemplary polarity coincidence detector.

FIG. 3 illustrates the two magnetic tapes 40, 40' containing the clipped signal tracks corresponding to the respective functions $f_1'(t)$ and $f_2'(t)$. Tapes 40, 40' are each transported at a given uniform velocity $v$ through the polarity coincidence detector to be described. The quantized recorded information, at values (+1) or (−1), is represented by a uniform flux intensity along the tapes, in successive regions of variable extent in the direction of movement, alternating in direction through the tapes. Such $(+1)$, $(-1)$ flux alternation is indicated by the vertically upward and downward arrows denoting such quantized regions along the tapes 40, 40'.

For a given relative displacement, representing a selected time phase shift $(\tau)$ between the $f_1'(t)$ and $f_2'(t)$ signals, the tape 40' is at the corresponding $f_2'(t-\tau)$ position. Multiplication of functions $f_1'(t)$ and $f_2'(t-\tau)$ is effected along the tapes 40, 40' when the following operation along them occurs: Opposed regions, as $a$, $b$, $c$, $d$, $e$ etc. of tapes 40, 40' provide these results thereat $(+1)$ for $(+1)(+1)$;
$(+1)$ for $(-1)(-1)$;
$(-1)$ for $(+1)(-1)$; and
$(-1)$ for $(-1)(+1)$.

The resultant "output" or "multiplied" signal levels for the regions $a$, $b$, $c$, $d$, $e$, etc. of the tapes 40, 40' is shown in curve 55. As seen in FIG. 3, a positive $(+1)$ contribution is made to the integral when the flux of the tapes 40 and 41 are in the same direction for both channels. When the flux direction in the regions $a$, $b$, $c$, $d$, $e$, etc. is not the same in both tapes or channels, a negative $(-1)$ contribution is made. This characteristic is utilized in the invention detector, as will now be set forth.

FIG. 4 is an end view of one form for the polarity coincidence detector 60, schematically shown in its four basic detection phases at A, B, C, D. The detector 60 comprises O-shaped magnetic body laminations 61, with a central magnetic path. The central path contains a common armature section 62 subtending two air gaps 63, 64 with body 61. The two tapes 40, 40' traverse air gaps 63, 64 in synchronous motion $v$, at selected time phase delays $(\tau)$ for their correlation. At an intermediate section or leg of body 61 is located a through-strip 65 of magneto-sensitive material. See also FIG. 5. Strip 65 thus intercepts magnetic flux in body 61. A balancing air gap 66 is also used.

The magnetic flux circuit is completed between both channels 40, 40' along an incremental length, in detector 60, across the air gaps 63, 64. The resultant magnetic flux of body 61 is correspondingly effective at strip 65. Practical means for producing the resultant magnetic integration as an output electric signal is set forth hereinafter. In detection phases A and B (FIG. 4) the flux of both tapes 40, 40' are in the same direction through detector 60; in phases C and D, in opposite directions. These magnetic summations thus are, per FIG. 4:

Phase A _____ $(+1)+(+1)=+2$
B _____ $(-1)+(-1)=-2$
C _____ $(+1)+(-1)=\ 0$
D _____ $(-1)+(+1)=\ 0$ FIG. 5 is a partial perspective view of another form for the polarity coincidence detector 70. The body laminations 71, 71 are C-shaped, of magnetic core (nonretentive) material. The magnetic armature 72 defines two air gaps 73, 74 with body 71. The two channel tapes 40, 40' are run through the gaps 73, 74 as in the detector 60 of FIG. 4. The magneto-sensitive flux detection strip 75 is "inserted" in the full leg of body laminations 71 to intercept the flux variations therethrough. This is preferably accomplished by a full break or cut across body laminations 71 in contact with strip 75, as shown. Strip 75 remains stationary with the detector 70, while tapes 40, 40' are transported linearly through it at a predetermined speed as aforesaid.

In the preferred embodiment for the detector 70, and also for unit 60, a significant number of laminated magnetic sections in parallel comprise the structures. The detectors 70 (and 60), or transducers, may have their magnetic laminations 71 (and 61) 0.01 inch or even 0.001 inch thick. This is dependent upon the desired linear recording density or flux reversals per inch of tape and the tape speed $v$, as will be understood by those skilled in the art. Non-magnetic spacers 76, 76 are interspaced between the magnetic sections 71, 72. These may be of the same order of thickness as the magnetic sections, primarily to prevent magnetic short circuiting between the detected flux paths in each section 71, 72.

The magneto-sensitive strip 75 is "threaded" through a multiple laminated transducer 70 to effectively instantaneously integrate the signals of the corresponding "length of tape" as long as the transducer or detector, per se. The material of the "integrating" strip 75 is selected with a relatively high magneto-resistive or magneto-strictive coefficient or characteristic. The exemplary strip 75 is made of suitable magneto-sensitive material such as bismuth or indium antimonide which functions on the total magnetic flux it intercepts. As a strip 75, it is subjected to the successive net flux impulses in the laminated sections 71, 72 by the quantized recorded flux signals on tapes 40, 40' as described hereinabove.

Magneto-sensitive tape 75 basically functions on the intercepted flux $\phi$, not the $d\phi/dt$ effect as due to the tape transport velocity $v$. The total resistance of the transducer strip 75 is an instantaneous and continuous integration and measure of the multiplied functions $f_1'(t)$ and $f_2'(t-\tau)$ on the tapes transported through the transducer-detector 70. A Wheatstone-type bridge circuit 80, shown in FIG. 6, is used to continuously measure the resistance of the transducer strip 75. This measure is translated by an output recorder 85 with a chart 86 related to the transported tapes 40, 40'. The output recorder 85 is biased to a value of $-B$, where B corresponds to the number of summations made by the integrating strip 75, each summation corresponding to a magnetic lamination 71 used, (see FIG. 5).

The basic strip 75 is connected as one arm of bridge 80, balanced by an identical strip 81 as a companion bridge arm. Two additional resistors 82, 83 complete the bridge, together with the usual battery 84. FIG. 7 shows, in exaggerated graphical form, a typical magneto-resistive relation, curve 88, for indium antimonide or bismuth material. At zero flux through the strip 75, its resistance is at $R_0$. At either $+\phi$ or $-\phi$ flux through the detector body 70, resultant from signals from tapes 40, 40' in the *same* direction (phases A and B), the resistance increases by a significant amount $\Delta R$. Where a magneto-strictive material is used instead of magneto-resistive indium antimonide or bismuth, as permalloy, a corresponding detector 80 and recorder 85 responsive thereto are used, as will be understood by those skilled in the art.

It is to be noted that the parabolic curvature of curve 88 provides equal $\Delta R$ values for the quantized signals recorded on tapes 40, 40', regardless of whether they are at $(+1)$ or $(-1)$; being polarity insensitive and thus providing the multiplication function per Phase A to D as hereinabove stated. When the signals $f_1(t)$ or $f_2(t-\tau)$ are not chopped but are instead recorded directly on the tapes there occurs a squaring operation due to the parabolic configuration 88. By comparing two sets of signals, one set forming a magnetic flux proportional to their sum and another set forming a magnetic flux proportional to their difference, into individual detectors arranged at 75 and 81 in the bridge of FIG. 6, an analogue system of correlation results. Each individual correlator channel hereof thereby computes as follows:

$$\int_0^T [f_1(t)+f_2(t-\tau)]^2 dt = \int_0^T [f_1(t)]^2 dt + \int_0^T 2f_1(t)\cdot f_2(t-\tau) dt + \int_0^T [f_2(t-\tau)]^2 dt$$

and $$\int_0^T [f_1(t)-f_2(t-\tau)]^2 dt = \int_0^T [f_1(t)]^2 dt - \int_0^T 2f_1(t)\cdot f_2(t-\tau) dt + \int_0^T [f_2(t-\tau)]^2 dt$$

respectively. Since the recorder 85 is connected across the bridge 80 it will be responsive to the difference between the above quantities, thus computing the analogue correlation function:

$$2\int_0^T f_1(t)\cdot f_2(t-\tau)dt = 4\psi_{12}(\tau)$$

As T is a constant in any correlation operation, it is clear that the result of this analogue correlation is directly proportional to the basic desired correlation function, as first set forth hereinabove.

The transducer 70 is preferably made long enough, in the tape transport direction across the tapes 40, 40' to instantaneously summate or integrate samples of the tapes for significant integration time T. Such of course depends on the nature of the signals $f_1(t)$, $f_2(t)$ and the problem at hand. A typical "length" for laminated detector 70 is for ten seconds of recorded tape. Such transducer 70 may for example be ten inches in practice. The longer the integration time T, the higher the processing gain. This improves the ability of the system to detect very weak signals. The detector 70 hereof may be physically constructed for a time span on the tapes at speed $v$ of 30 or 60 seconds, or even longer integration intervals.

The change in resistance of strip 75 threaded through polarity coincidence detector 70 varies in proportion to the integral of the product of $f_1'(t) \times f_2'(t)$. The delays ($\tau$) may be set by moving one tape 40' with respect to the other 40. Thus the correlation function $\psi_{12}(\tau)$ may be computed in the very short time it takes to move one of the tape channel through the delays ($\tau$).

Although my invention has been set forth in connection with exemplary embodiments thereof, it is to be understood that variations and modifications may be made without departing from the broader spirit and scope of the invention as set forth in the appended claims.

What is claimed is:

1. In a system for correlating a plurality of signals received over an interval of time, with means for recording the signals on individual magnetic recording tracks: magnetic detector means comprising a body of magnetic material with a section for each of said tracks for producing magnetic flux variations in said body in proportion to magnetic recordings on the tracks as moved past the respective sections, and a magneto-sensitive member positioned in a gap portion of said body and responsive to the absolute magnitude of the net of the flux variations therethrough resultant from passage of said recorded tracks, said member producing an output signal that corresponds to the instantaneous integral of the product of the received signals.

2. In a system for correlating a plurality of signals received over an interval of time, with circuit means for clipping the signals and means for recording the clipped signals on individual magnetic recording tracks: a coincidence detector comprising a body of magnetic material with a section for each of said tracks for producing magnetic flux variations in said body in proportion to magnetic recordings on the tracks as moved past the respective sections, and a magneto-sensitive member positioned in a gap portion of said body and responsive to the absolute magnitude of the net of the flux variations therethrough resultant from passage of said recorded tracks, said member producing an output signal that corresponds to the instantaneous integral of the product of the received signals.

3. In a system for correlating two signals received over an interval of time, with circuit means for clipping the received signals and means for magnetically recording the clipped signals in quantized form on individual magnetic recording tracks as corresponding quantized signal trains: a polarity coincidence detector comprising a body of magnetic material with a gap section for each of said tracks for producing magnetic flux variations in said body in proportion to magnetic recordings on the tracks as moved past the respective sections, and a magneto-sensitive member positioned in a gap portion of said body and responsive to the absolute magnitude of the net of the flux variations therethrough resultant from passage of said recorded tracks, said member producing an output signal that corresponds to the instantaneous integral of the product of the received signals.

4. In a system for correlating two signals received in relative time delay over an interval of time, with circuit means for clipping the received signals and means for magnetically recording the clipped signals in the perpendicular mode on individual magnetic recording tracks as corresponding quantized signal trains: a polarity coincidence detector comprising a body of magnetic material arranged in a closed magnetic path with a gap section for each of the tracks, and a magneto-sensitive member inserted in said magnetic body for detecting flux variations therethrough resultant from passage of said recorded tracks, said member generating current substantially proportional to the square of said net flux and an output signal that corresponds to the instantaneous integral of the product of the received signals.

5. In a system as claimed in claim 1, in which the magneto-sensitive member is made of indium antimonide in strip form.

6. In a system as claimed in claim 1, in which the magneto-sensitive member is made of bismuth in strip form.

7. In a system as claimed in claim 1, in which the magnetic body is composed of a plurality of spaced magnetic laminations.

8. In a system as claimed in claim 1, in which the magneto-sensitive member is in strip form and the magnetic body is composed of a plurality of spaced magnetic laminations with the integrating strip member threaded therethrough.

9. In a system as claimed in claim 1, further including bridge means in circuit with said member to provide an output voltage proportional to said instantaneous integral of the product of the levels of said received signals.

10. In a system as claimed in claim 2, in which the magneto-sensitive member is made indium antimonide in strip form and the magnetic body is composed of alternate parallel magnetic and non-magnetic laminations with the integrating strip member threaded therethough.

11. In a system as claimed in claim 2, in which the magneto-sensitive member is made of bismuth.

12. In a system as claimed in claim 3, in which the magneto-sensitive member is in strip form.

13. In a system as claimed in claim 3, in which the magneto-sensitive member is in strip form and the magnetic body is composed of a plurality of spaced magnetic laminations with the integrating strip member threaded therethrough.

14. In a system as claimed in claim 3, further including bridge means in circuit with said member to provide an output voltage proportional to said instantaneous integral of the product of the levels of said received signals.

15. In a system as claimed in claim 4, in which the magneto-sensitive member is made of indium antimonide in strip form.

16. In a system as claimed in claim 4, in which the magneto-sensitive member is made of indium antimonide in strip form and the magnetic body is composed of alternate parallel magnetic and non-magnetic laminations with the integrating strip member threaded therethrough.

17. In a system as claimed in claim 16, further including bridge means in circuit with said strip member to provide an output voltage proportional to said instantaneous integral of the product of the levels of said received signals.

18. Magnetic detector means for correlating a plurality of signals received over an interval of time comprising a body of magnetic material with a section to accommodate an individual magnetic track for each of the received signals, a magneto-sensitive member positioned in a gap portion of said body and responsive to the absolute magnitude of the net of the flux variations therethrough resultant from the passage of the individual magnetic tracks of the signals in recorded form, said member producing an output signal that corresponds to the instantaneous integral of the product of the received signals.

19. In a system as claimed in claim 18, in which the magnetic body is composed of alternate magnetic and non-magnetic laminations.

20. In a system as claimed in claim 18, in which the magneto-resistive member is made of indium antimonide in strip form.

21. Magnetic detector means for correlating two signals received over an interval of time comprising a body of magnetic material arranged in a closed magnetic path with a gap section to accommodate an individual magnetic track for each of the received signals, a magneto-sensitive member inserted in said magnetic body for detecting the absolute magnitude of the net of the flux variations therethrough resultant from the passage of the individual magnetic tracks of the signals in recorded form, said member generating current substantially proportional to the square of said net flux and an output signal that corresponds to the instantaneous integral of the product of the received signals.

22. In a system as claimed in claim 21, in which the magneto-sensitive member is made of indium antimonide in strip form and the magnetic body is composed of a plurality of spaced parallel magnetic laminations with the integrating strip member threaded therethrough.

References Cited by the Examiner
UNITED STATES PATENTS

| | | | |
|---|---|---|---|
| 2,921,989 | 1/1960 | Serrell | 179—100.2 |
| 2,987,581 | 6/1961 | Kuhrt et al. | 179—100.2 |
| 3,041,416 | 6/1962 | Kuhrt | 179—100.2 |
| 3,156,817 | 11/1964 | Briggs | 235—181 |
| 3,174,142 | 3/1965 | Mallinckrodt | 235—181 X |
| 3,200,207 | 8/1965 | Rainer et al. | 179—100.2 |

OTHER REFERENCES

Rosenheck, B. M., Detecting Signals by Polarity Coincidence. In Electronics, January 29, 1960, pages 67–69.

MALCOLM A. MORRISON, *Primary Examiner.*

I. KESCHNER, *Assistant Examiner.*